(12) United States Patent
Hagio

(10) Patent No.: US 7,372,994 B2
(45) Date of Patent: May 13, 2008

(54) IMAGE PROCESSING DEVICE FOR RECOGNIZING OUTLINE OF MOVING TARGET AND METHOD THEREFOR

(75) Inventor: Kenichi Hagio, Toyonaka (JP)

(73) Assignee: Matsushita Electric Works, Ltd., Kadoma-shi (JP)

( * ) Notice: Subject to any disclaimer, the term of this patent is extended or adjusted under 35 U.S.C. 154(b) by 1098 days.

(21) Appl. No.: 10/722,481

(22) Filed: Nov. 28, 2003

(65) Prior Publication Data
US 2004/0175044 A1  Sep. 9, 2004

(30) Foreign Application Priority Data
Mar. 3, 2003  (JP)  ............................... 2003-056357

(51) Int. Cl.
G06K 9/48 (2006.01)
(52) U.S. Cl. ...................................... 382/199; 382/203
(58) Field of Classification Search ................ 382/199, 382/203
See application file for complete search history.

(56) References Cited

U.S. PATENT DOCUMENTS

| 6,548,804 | B1 | 4/2003 | Yuhara et al. | |
| 6,934,414 | B2* | 8/2005 | Kondo et al. | 382/199 |
| 6,987,535 | B1* | 1/2006 | Matsugu et al. | 348/239 |
| 2004/0037361 | A1* | 2/2004 | Gudis | 375/240.27 |

FOREIGN PATENT DOCUMENTS

| DE | 199 47 062 | 4/2000 |
| EP | 1 281 983 | 2/2003 |
| JP | 6-337938 | 12/1994 |
| JP | 11-284997 | 10/1999 |
| JP | 2000-82145 | 3/2000 |
| KR | 1998-066894 | 10/1998 |

* cited by examiner

Primary Examiner—Matthew C. Bella
Assistant Examiner—Mike Rahmjoo
(74) Attorney, Agent, or Firm—Oblon, Spivak, McClelland, Maier & Neustadt, P.C.

(57) ABSTRACT

An image processing device is provided, which has the capability of accurately recognizing the outline of a moving target from at least four still images taken in times series without using a background image not including the moving target. This device comprises a first operation unit for outputting a processed outline image by use of a reference image taken at a reference time, a pair of images taken at first and second times other than the reference time, a second operation unit for outputting a processed outline image by use of the reference image and an image taken at a third time different from the reference time, the first time and the second time, and an outline extracting unit for extracting the outline of the moving target from these processed outline images.

15 Claims, 11 Drawing Sheets

IMAGE PROCESSING DEVICE FOR RECOGNIZING OUTLINE OF MOVING TARGET AND METHOD THEREFOR

BACKGROUND OF THE INVENTION

1. Field of the Invention

The present invention relates to an image processing device for recognizing the outline of a moving target such as human and vehicle from a plurality of still images.

2. Disclosure of the Prior Art

In the past, an image processing device using a background subtraction method or a frame subtraction method has been proposed to recognize a moving target such as human and vehicle. In these methods, image processing is performed to grayscale images, and outline images are used to minimize the influence of a change in brightness such as lighting.

The principle of the image processing device according to the background subtraction method is explained in brief referring to FIG. 11. In this image processing, a background image ($\alpha$) including no moving target is previously taken, and stored. Then, a plurality of images ($\beta$) each including the moving target are taken in time series. Each of the obtained images is converted into a binary outline image by use of a SOBEL operator, and stored. By determining a difference between a required outline image and the background image, a region having a predetermined amount of change therebetween is recognized as the region corresponding to the moving target (X).

However, the step of previously preparing the background image is a messy step. In addition, in a case of using an average of the images taken within a required time period as the background image, when the moving target is in a state of rest within the time period, a recognition error of the moving target may occur from the subsequent image processing. This becomes a cause of decreasing the reliability of the image processing device.

As another image processing device using the background subtraction method, Japanese Patent [Early] Publication No. 6-337938 discloses an image processor and a distance measuring device. In this image processing, a first image that is a background image including no moving target, a second image including the background and a moving target with a first speed or less, and a third image including the background and another moving target with a second speed or less are used. A difference between the first and second images is determined to obtain a first subtraction image. Similarly, a difference between the second and third images is determined to obtain a second subtraction image. In addition, a difference between the third image and an image provided by an image input means is determined to obtain a third subtraction image. According to the first to third subtraction images, motions of the moving targets with different speeds can be analyzed at a video rate.

Since this image processor uses the background subtraction method, the messy step of previously preparing the background image is still needed. In addition, since it is difficult to precisely generate the backgrounds of the first to third images, there is a fear of deteriorating the accuracy of analyzing the motions of the moving targets with different speeds. Moreover, there is another problem that this image processing is sensitive to a change in brightness.

On the other hand, the principle of the image processing device according to the frame subtraction method is explained in brief referring to FIG. 12. In this image processing, a subtraction $|(T)-(T-\Delta T1)|$ between first and second images taken at different times $(T, T-\Delta T1)$ is calculated, so that a region with a predetermined amount of change therebetween is recognized as the region corresponding to the moving target.

According to this method, the step of previously preparing the background image is no longer necessary. However, in the case of determining the absolute-value subtraction, the outline of the moving target (X) may be extracted such that two outlines partially overlap with each other, as shown in FIG. 12. On the other hand, in the case of determining a saturated subtraction, the problem of the absolute-value subtraction can be solved. However, when is a negative value is obtained by the subtraction, it is regarded as zero. Therefore, when an outline of the background hidden by the target appears in the image by a movement of the target, there is a problem that the outline of the background (Y) is accidentally extracted together with the outline of the moving target (X), as shown in FIG. 13.

As another image processing device using the frame subtraction method, Japanese Patent [Early] Publication No. 2000-82145 discloses an object extraction device of recognizing the moving target from three images taken in times series. In this image processing, a set of first, second and third images each including the moving target are taken at different times $(T-\Delta T1, T. T+\Delta T1)$. From the frame subtractions between the first and second images and between the second and third images, a pair of subtraction images are obtained. In each of the subtraction images, a background region is determined, so that the remaining region is selected as a candidate region of the moving target. Finally, by determining an intersection of the candidate regions, the outline of the moving target at the time (T) can be extracted.

However, when the moving target is parts of the human body such as arms and legs, there is a case that the parts with motions at the first time are different from them with motions at the second time, and similarly the parts with motions at the second time are different from them with motions at the third time. In such a case, the outline extracted by the frame subtraction between the first and second images becomes different from the outline extracted by the frame subtraction between the second and third images. As a result, the outline obtained by determining the intersection of the candidate regions may lose a considerable part of the outline of the moving target to be extracted.

Thus, from the viewpoint of further improving the accuracy of recognizing the moving target without including the background information, there is still room for improvement in conventional image processing devices.

SUMMARY OF THE INVENTION

Therefore, a primary concern of the present invention is to provide an image processing device, which has the capability of accurately for recognizing an outline of a moving target without previously preparing a background image not including the moving target.

That is, the image processing device of the present invention comprises an image pick-up unit, image converter, memory, first operation unit, second operation unit, and an outline extracting unit. The image pick-up unit takes a plurality of images in times series, in each of which the moving target exists. The image converter converts the images into outline images. The outline images are stored in the memory. The first operation unit performs an operation with use of a reference outline image that is one of the outline images corresponding to the image taken at a reference time, a first outline image that is one of the outline images corresponding to the image taken at a first time other than the reference time, and a second outline image that is one of the outline images corresponding to the image taken at a second time other than the reference time and the first time, to provide a processed outline image having only outlines with any positional change that occurs between the reference time, the first time and the second time. The second operation unit performs an operation with use of the reference outline image, and a third outline image that is one of the outline images corresponding to the image taken at a third time other than the reference time, the first time and the second time, to provide a processed outline image having only outlines with any positional change that occurs between the reference time and the third time. The outline extracting unit extracts the outline of the moving target from the processed outline images provided from the first operation unit and the second operation unit.

In a preferred embodiment of the present invention, the second operation unit performs the operation with use of the reference outline image, the third outline image, and a fourth outline image that is one of the outline images corresponding to the image taken at a fourth time other than the reference time, the first time, the second time and the third time, to provide the processed outline image having only outlines with any positional change that occurs between the reference time, the third time and the fourth time.

In a further preferred embodiment of the present invention, the first operation unit performs the operation with use of the reference outline image that is the outline image corresponding to the image taken at the center of both of first and second time periods as the reference time, the first outline image that is the outline image corresponding to the image taken at a start time of the first time period as the first time, and the second outline image that is the outline image corresponding to the image taken at a finish time of the first time period as the second time. On the other hand, the second operation unit performs the operation with use of the reference outline image, the third outline image that is the outline image corresponding to the image taken at a start time of the second time period as the third time, and the fourth outline image that is one of the outline images corresponding to the image taken at a finish time of the second time period as the fourth time.

In another preferred embodiment of the present invention, the first operation unit performs the operation with use of the reference outline image that is the outline image corresponding to the image taken at the center of a first time period as well as an end of a second time period as the reference time, the first outline image that is the outline image corresponding to the image taken at a start time of the first time period as the first time, and the second outline image that is the outline image corresponding to the image taken at a finish time of the first time period as the second time. On the other hand, the second operation unit performs the operation with use of the reference outline image, and the third outline image that is the outline image corresponding to the image taken at the other end of the second time period as the third time.

In addition, it is preferred that the outline extracting unit performs a minimum operation between the processed outline images provided from the first operation unit and the second operation unit.

In a preferred embodiment of the present invention, the first operation unit performs a minimum operation between the first outline image and the second outline image, and then determines a difference between the reference outline image and a result of the minimum operation, to provide the processed outline image. On the other hand, the second operation unit performs a minimum operation between the third and the fourth outline images, and then determines a difference between the reference outline image and a result of the minimum operation, to provide the processed outline image.

In a further preferred embodiment of the present invention, the first operation unit performs a minimum operation between the first outline image and the second outline image, and then determines a difference between the reference outline image and a result of the minimum operation, to provide the processed outline image. On the other hand, the second operation unit performs a minimum operation between the third and the fourth outline images, and then determines a difference between the reference outline image and a result of the minimum operation, to provide the processed outline image.

In another preferred embodiment of the present invention, the first operation unit performs a minimum operation between the first outline image and the second outline image, and then determines a difference between the reference outline image and a result of the minimum operation, to provide the processed outline image. On the other hand, the second operation unit determines a difference between the reference outline image and the third outline image to provide the processed outline image.

In still another preferred embodiment of the present invention, the first operation unit performs the operation with use of the reference outline image that is the outline image corresponding to the image taken a finish end of a first time period as well as a start end of a second time period as the reference time, the first outline image that is the outline image corresponding to the image taken at the first time within the first time period, and the second outline image that is the outline image corresponding to the image taken at a start end of the first time period as the second time. On the other hand, the second operation unit performs the operation with use of the reference outline image, the third outline image that is the outline image corresponding to the image taken at the third time within the second time period, and the fourth outline image that is the outline image corresponding to the image taken at a finish end of the second time period as the fourth time. In this case, it is particularly preferred that a time interval between the first time and the reference time is equal to the time interval between the third time and the reference time, and a time interval between the second time and the reference time is equal to the time interval between the fourth time and the reference time.

In a preferred embodiment of the present invention, the first operation unit performs the operation with use of the reference outline image that is the outline image corresponding to the image taken at a finish end of a first time period as well as a start end of a second time period as the reference time, the first outline image that is the outline image corresponding to the image taken at the first time within the first time period, and the second outline image that is the outline image corresponding to the image taken at a start end of the first time period as the second time. On the other hand, the second operation unit performs the operation with use of the reference outline image, and the third outline image that is the outline image corresponding to the image taken at a finish end of the second time period as the third time. In this case, it is particularly preferred that a time interval between the first time and the reference time is equal to the time interval between the third time and the reference time.

In a preferred embodiment of the present invention, the first operation unit performs a minimum operation between the first outline image and the second outline image, and then determines a difference between the reference outline image and a result of the minimum operation, to provide the processed outline image. On the other hand, the second operation unit performs a minimum operation between the third and the fourth outline images, and then determines a difference between the reference outline image and a result of the minimum operation, to provide the processed outline image.

In a further preferred embodiment of the present invention the first operation unit performs a minimum operation between the first outline image and the second outline image, and then determines a difference between the reference outline image and a result of the minimum operation, to provide the processed outline image. On the other hand, the second operation unit determines a difference between the reference outline image and the third outline image to provide the processed outline image.

Another concern of the present invention is to provide an image processing method of recognizing an outline of a moving target, which has the capability of achieving the same advantages as the image processing device described above.

That is, in the image processing method of the present invention, a plurality of images, in each of which the moving target exists, are taken in times series, and then converted into outline images. The outline images are stored in a memory. Next, a first operation is performed with use of a reference outline image that is one of the outline images corresponding to the image taken at a reference time, a first outline image that is one of the outline images corresponding to the image taken at a first time other than the reference time, and a second outline image that is one of the outline images corresponding to the image taken at a second time other than the reference time and the first time, to provide a processed outline image having only outlines with any positional change that occurs among the reference time, the first time and the second time. In addition, a second operation is performed with use of the reference outline image, and a third outline image that is one of the outline images corresponding to the image taken at a third time other than the reference time, the first time and the second time, to provide a processed outline image having only outlines with any positional change that occurs between the reference time and the third time. Finally, the outline of the moving target is extracted from the processed outline images obtained by the first and second operations.

These and still other objects and advantages of the present invention will become more apparent from the preferred embodiments of the invention explained in details below, referring to the attached drawings.

PREFERRED EMBODIMENTS OF THE INVENTION

Image processing device and method of the present invention are explained in detail according to preferred embodiments.

First Embodiment

Figure 1:
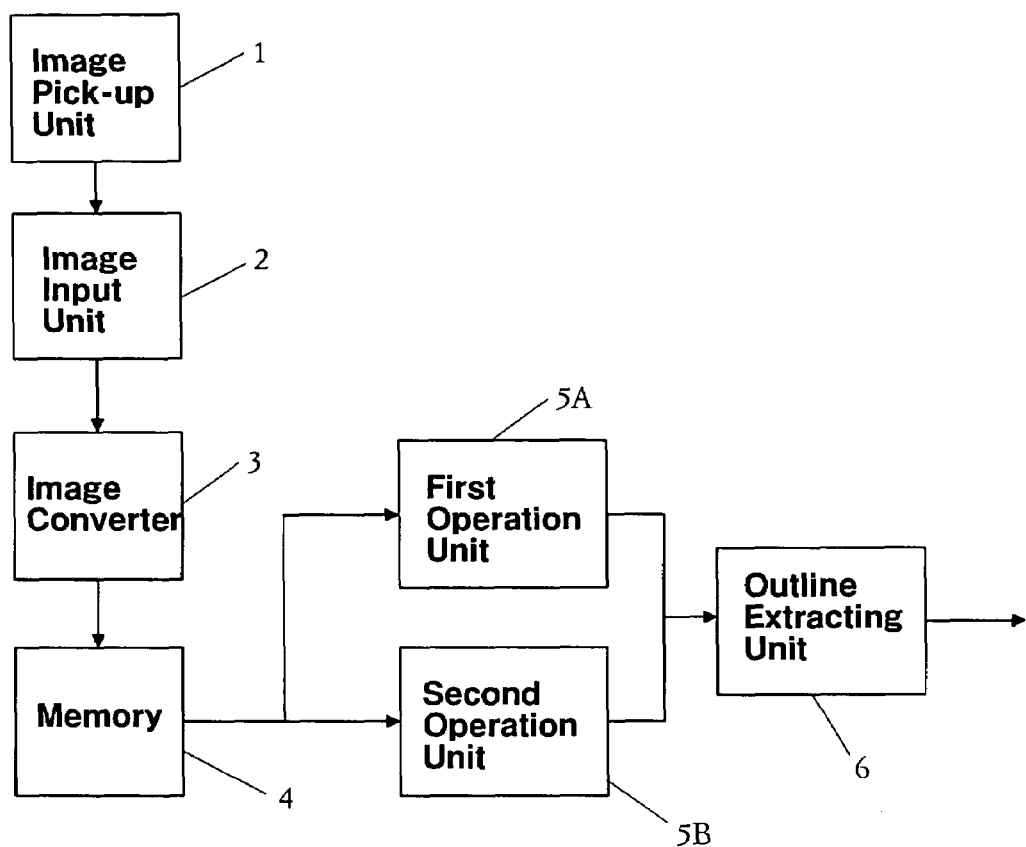
FIG. 1 is a block diagram of an image processing device according to a first embodiment of the present invention.

As shown in FIG. 1, the image processing device of the present embodiment has the capability of recognizing the outline of a moving target from five still images taken in times series without using a background image not including the moving target. That is, this device is composed of an image pickup unit 1 for taking a plurality of images in times series, image input unit 2, in which the images taken by the image pick-up unit 1 is input, an image converter 3 for converting the images of the image input unit 2 into outline images, a memory 4 for storing the outline images, first and second operation units (5A, 5B), and an outline extracting unit 6 for extracting the outline of the moving target from outputs of the first and second operation units.

The first operation unit 5A performs an operation with use of a reference outline image $E(T)$ that is an outline image corresponding to the image taken at a reference time $(T)$, an outline image $E(T-\Delta T2)$ corresponding to the image taken at the time $(T-\Delta T2)$, and an outline image $E(T+\Delta T2)$ corresponding to the image taken at the time $(T+\Delta T2)$, to provide a processed outline image including only outlines with any positional change that occurs between the times $(T-\Delta T2)$, $(T)$ and $(T+\Delta T2)$.

On the other hand, the second operation unit 5B performs an operation with use of the reference outline image $E(T)$, an outline image $E(T-\Delta T1)$ corresponding to the image taken at the time $(T-\Delta T1)$, and an outline image $E(T+\Delta T1)$ corresponding to the image taken at the time $(T+\Delta T1)$, to provide a processed outline image including only outlines with any positional change that occurs between the times $(T-\Delta T1)$, $(T)$ and $(T+\Delta T1)$. The outline extracting unit 6 extracts only the outline of the moving target by synthesizing the outlines of those processed outline images.

Figure 2:
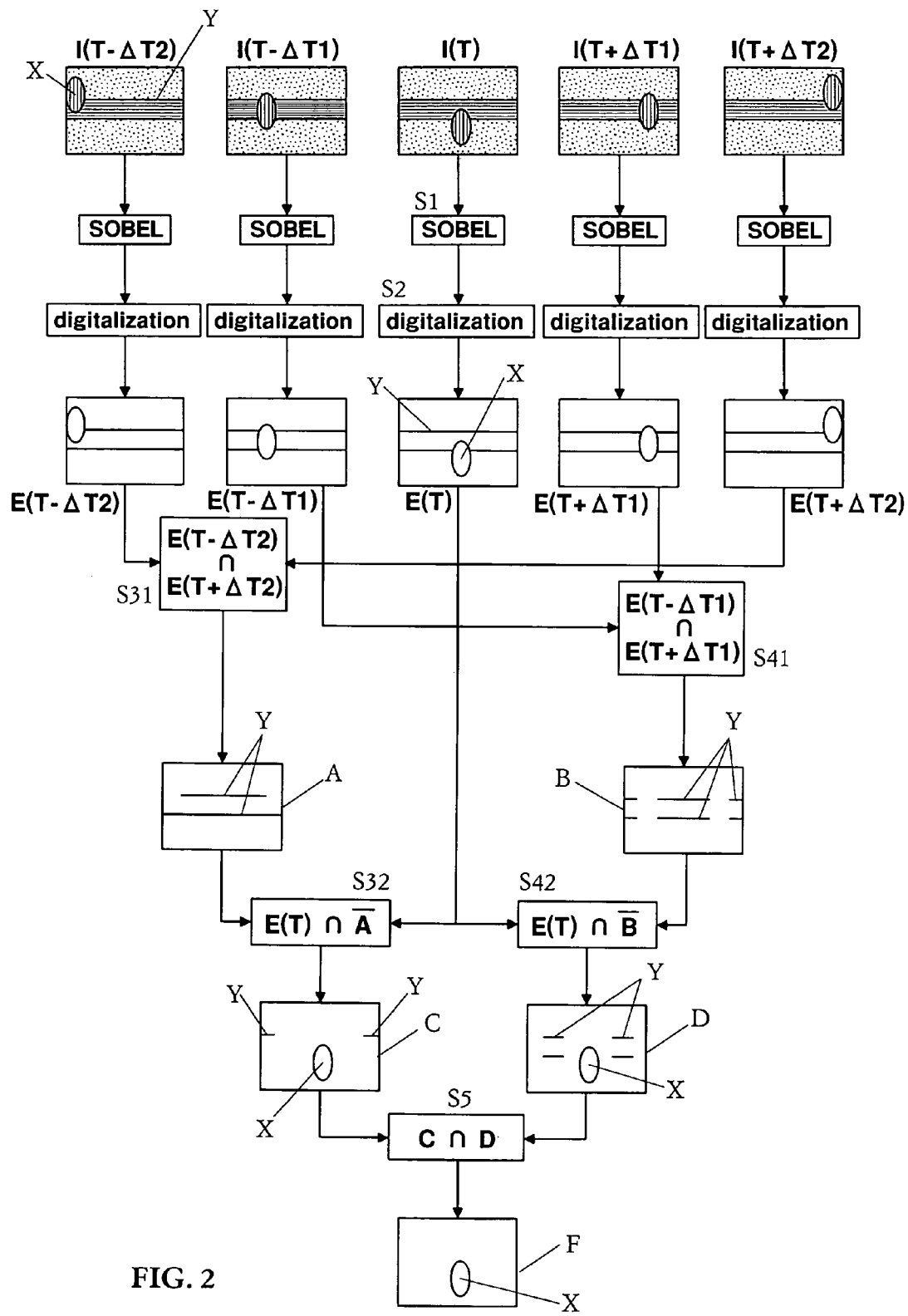
FIG. 2 is a flow diagram of an image processing method according to the first embodiment.

Referring to the flow diagram of FIG. 2, the image processing method of the present embodiment is explained. For example, the image converter 3 converts an image $I(T)$ taken at the reference time $(T)$ by the image pick-up unit 1 into a corresponding outline image $E(T)$ by use of a differential filter such as SOBEL operator (step S1). The obtained outline image is digitized according to a required threshold value, and then stored as a binary outline image $E(T)$ corresponding to the image $I(T)$ in the memory 4 (step S2). Similarly, binary outline images $E(T-\Delta T2)$ and $E(T+\Delta T2)$ respectively corresponding to the images $I(T-\Delta T2)$ and I(T+ΔT2), and binary outline images E(T−ΔT1) and E(T+ΔT1) respectively corresponding to the images I(T−ΔT1) and I(T+ΔT1) are stored in the memory 4.

In the first operation unit 5A, a logical multiplication of the outline images E(T−ΔT2) and E(T+ΔT2) is calculated (step S31). The outline image (A) of FIG. 2 obtained by this logical multiplication includes only the outlines with no change between the times (T−ΔT2) and (T+ΔT2). Next, the outline image (A) is grayscale inverted to obtain an inverted outline image. In the outline image (A), it is interpreted that the black line showing the presence of the outline (Y) means "1", and the white region showing the absence of the outline means "0". Therefore, in the inverted outline image, the presence of the outline (Y) is shown by white, and the absence of the outline is shown by black. Then, a logical multiplication of the reference outline image E(T) and the inverted outline image is calculated (step S32) to obtain a processed outline image (C) of FIG. 2. In short, only regions shown by black in the reference outline image E(T) and by white in the outline image (A) can be extracted by this logical multiplication. In this embodiment, the processed outline image (C) includes only the outline of the moving target (X) at the reference time (T), the outline of the background (Y) hidden by the moving target (X) at the time (T−ΔT2) and appeared at the reference time (T), and the outline of the background (Y) appeared at the reference time (T) and hidden by the moving target (X) at the time (T+ΔT2).

On the other hand, in the second operation unit 5B, a logical multiplication of the outline images E(T−ΔT1) and E(T+ΔT1) is calculated (step S41). The outline image (B) of FIG. 2 obtained by this logical multiplication includes only the outlines with no change between the times (T−ΔT1) and (T+ΔT1). As in the case of the outline image (A), the outline image (B) is grayscale inverted to obtain an inverted outline image, and then a logical multiplication of the reference outline image E(T) and the inverted outline image is calculated (step S42) to obtain a processed outline image (D) of FIG. 2. In this embodiment, the processed outline image (D) includes only the outline of the moving target (X) at the reference time (T), the outline of the background (Y) hidden by the moving target (X) at the time (T−ΔT1) and appeared at the reference time (T), and the outline of the background (Y) appeared at the reference time (T) and hidden by the moving target (X) at the time (T+ΔT1).

The outline extracting unit 6 calculates a logical multiplication of the outline image (C) that is an output of the first operation unit 5A and the outline image (D) that is an output of the second operation unit 5B (step S5) to output an outline synthesized image (F) including only the outline of the moving target without substantially including the outline of the background.

Thus, since the outline images (C) and (D) are obtained by removing each of the outline images (A) and (B) from the reference outline image E(T), the outline of the moving target in the reference outline image is left in both of the outline images (C) and (D). In addition, since the outline of the background (Y) left in the outline image (C) are different in position from the outline of the background (Y) left in the outline image (D), they are eliminated by the logical multiplication performed at the step S5. Therefore, the image processing device of the present embodiment can extract only the outline of the moving target.

Figures 3A, 3B:
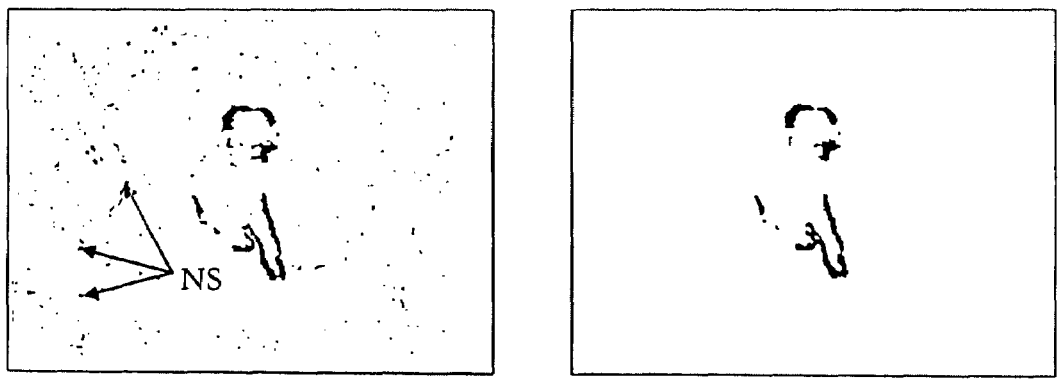
FIGS. 3A and 3B are diagrams showing an effect of a noise reduction unit.

The image processing device described above may comprise a noise reduction unit 7 for reducing noise from the outline synthesized image (F) provided by the outline extracting unit 6. For example, there is a case that the image (F) contains noise, as shown in FIG. 3A. Since the outline images stored in the memory 4 are binary images, the outline having an intensity in the vicinity of the threshold value is unstable with respect to time. In other words, whether the intensity of the outline is larger than the threshold value fluctuates with time. The noise included in the outline synthesized image (F) is caused by this influence.

As an example, a filter of 3×3 pixels can be used for the noise reduction unit 7. By scanning this filter on the image (F), whether a region of the image corresponding to the center pixel and the surrounding eight pixels of the filter contains the outline component is checked. When the region contains the outline component, the number of pixels containing the outline component is counted. When the counted number is larger than a threshold value, it is regarded that the outline exists on the scanning point. As a result, a noise reduced image is obtained, as shown in FIG. 3B.

By the way, when the moving target has an intermittent motion, it is difficult to accurately extract the outline of the moving target by the conventional image processing device using the frame subtraction method. However, according to the image processing device of the present embodiment, it is possible to extract the outline of the moving target with improved accuracy, regardless of whether the moving target has an intermittent motion or a continuous motion.

Second Embodiment

An image processing device of the second embodiment of the present invention is substantially the same as the device of the first embodiment except for the following features. Therefore, no duplicate explanation is deemed to be necessary.

Figure 4:
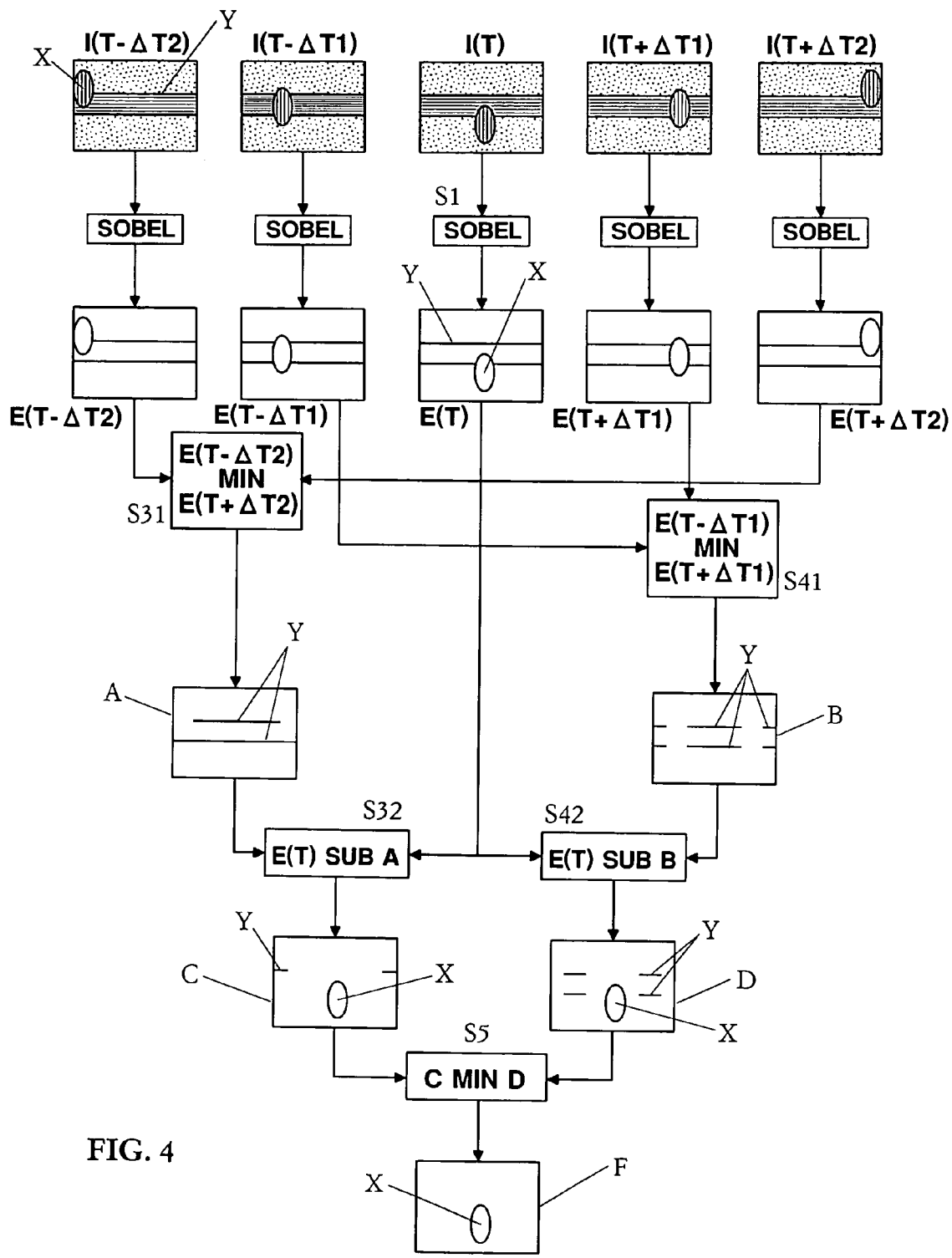
FIG. 4 is a flow diagram of an image processing method according to a second embodiment of the present invention.

That is, in this embodiment, the outline image obtained through the differential filter is not digitized. Due to the absence of digitalization, the first operation unit 5A performs a minimum operation in place of calculating the logical multiplication, as shown in FIG. 4. The minimum operation is defined as a treatment of preparing a processed image by use of a smaller pixel value of corresponding two pixels between two outline images. For example, in the first operation unit 5A, the minimum operation is performed by comparing a grayscale value of the outline image E(T−ΔT2) with the corresponding grayscale value of the outline image E(T+ΔT2), to output a smaller grayscale value thereof (step S31). As a result, the outline image (A) of FIG. 4 is obtained. Similarly, in the second operation unit 5B, the minimum operation is performed by comparing the grayscale value of the outline image E(T−ΔT1) with the corresponding grayscale value of the outline image E(T+ΔT1), to output a smaller grayscale value thereof (step S41). As a result, the outline image (B) of FIG. 4 is obtained.

In the step S32, the first operation unit 5A outputs a difference of grayscale value between the reference outline image E(T) and the image (A) obtained by the step S31. As a result, the outline image (C) of FIG. 4 is obtained. On the other hand, in the step S42, the second operation unit 5B outputs a difference of grayscale value between the reference outline image E(T) and the outline image (B) obtained by the step S41. As a result, the outline image (D) of FIG. 4 is obtained. When the difference is a negative value, it is regarded as zero. Next, the outline extraction unit 6 performs a minimum operation by comparing the grayscale value of the outline image (C) with the corresponding grayscale value of the outline image (D) to output the outline having a smaller grayscale value thereof as an outline synthesized image (F). Thus, the outlines of the background (Y) included in the outline images (C) and (D) are eliminated by the minimum operation performed at the step S5. As a result, the image processing device of the present embodiment can extract only the outline of the moving target (X).

Third Embodiment

An image processing device of the third embodiment of the present invention is substantially the same as the device of the first embodiment except for the following features. Therefore, no duplicate explanation is deemed to be necessary.

A first operation unit 5A of the present embodiment performs an operation with use of a reference outline image E(T) that is an outline image corresponding to the image taken at a reference time (T), and an outline image E(T−ΔT2) corresponding to the image taken at the time (T−ΔT2), to provide a processed outline image having only the outlines with any positional change that occurs between the times (T−ΔT2) and (T).

On the other hand, a second operation unit 5B of the present embodiment performs an operation with use of the reference outline image E(T), an outline image E(T−ΔT1) corresponding to the image taken at the time (T−ΔT1), and an outline image E(T+ΔT1) corresponding to the image taken at the time (T+ΔT1), to provide a processed outline image having only the outlines with any positional change that occurs between the times (T−ΔT1), (T) and (T+ΔT1). The outline extracting unit 6 extracts only the outline of the moving target by synthesizing the outlines of these processed outline images.

Figure 5:
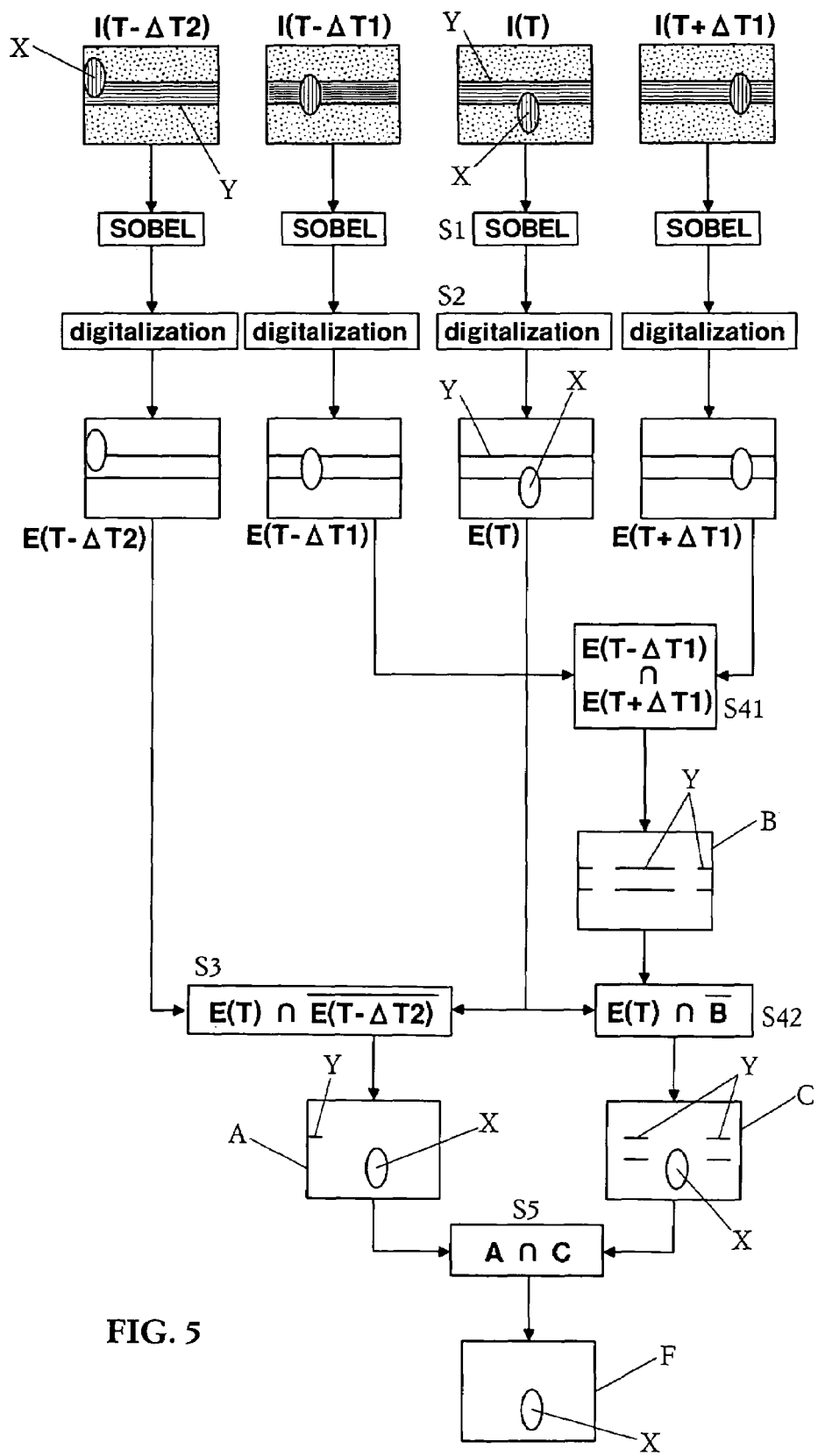
FIG. 5 is a flow diagram of an image processing method according to a third embodiment of the present invention.

Referring to the flow diagram of FIG. 5, the image processing method of the present embodiment is explained. As in the case of the first embodiment, the reference outline image E(T) and the outline images E(T−ΔT2), E(T−ΔT1) and E(T+ΔT1) respectively corresponding to the images I(T), I(T−ΔT2), I(T−ΔT1) and I(T+ΔT1) are stored in the memory 4.

In the first operation unit 5A of this embodiment, the outline image E(T−ΔT2) is grayscale inverted to obtain an inverted outline image. In the outline image E(T−ΔT2), it is interpreted that the black line showing the presence of the outline means "1", and the white region showing the absence of the outline means "0". Therefore, in the inverted outline image, the presence of the outline is shown by white, and the absence of the outline is shown by black. Then, a logical multiplication of the reference outline image E(T) and the inverted outline image is calculated (step S3) to obtain a processed outline image (A) of FIG. 5. In short, only regions shown by black in the reference outline image E(T) and by white in the outline image E(T−ΔT2) can be extracted by this logical multiplication. In this embodiment, the processed outline image (A) includes the outline of the moving target (X) at the reference time (T) and the outline of the background (Y) hidden by the moving target (X) at the time (T−ΔT2) and appeared at the reference time (T).

On the other hand, in the second operation unit 5B of this embodiment, a logical multiplication of the outline images E(T−ΔT1) and E(T+ΔT1) is calculated (step S41). The outline image (B) of FIG. 5 obtained by this logical multiplication includes only the outlines with no change between the times (T−ΔT1) and (T+ΔT1). As in the case of the outline image E(T−ΔT2), the outline image (B) is grayscale inverted to obtain an inverted outline image, and then a logical multiplication of the reference outline image E(T) and the inverted outline image is calculated (step S42) to obtain a processed outline image (C) of FIG. 5. In this embodiment, the processed outline image (C) includes the outline of the moving target (X) at the reference time (T), the outline of the background (Y) hidden by the moving target (X) at the time (T−ΔT1) and appeared at the reference time (T), and the outline of the background (Y) appeared at the reference time (T) and hidden by the moving target (X) at the time (T+ΔT1).

Next, an outline extracting unit 6 calculates a logical multiplication of the outline image (A) that is an output of the first operation unit 5A and the outline image (C) that is an output of the second operation unit 5B (step S5) to output an outline synthesized image (F) including only the outline of the moving target without substantially including the outline of the background.

Fourth Embodiment

An image processing device of the fourth embodiment of the present invention is substantially the same as the device of the third embodiment except for the following features. Therefore, no duplicate explanation is deemed to be necessary.

Figure 6:
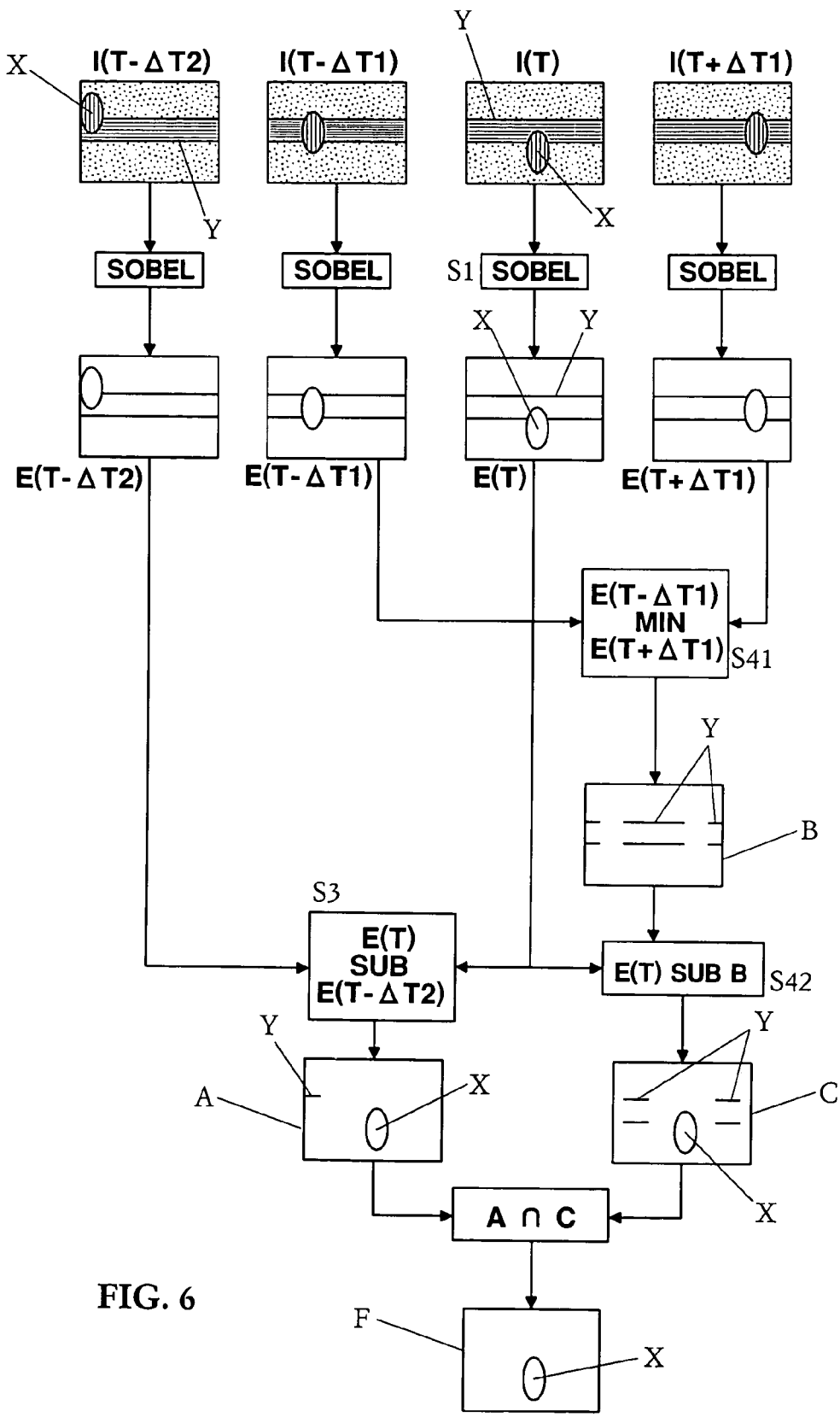
FIG. 6 is a flow diagram of an image processing method according to a fourth embodiment of the present invention.

That is, in this embodiment, the outline image obtained through the differential filter is not digitized. In addition, as shown in FIG. 6, a first operation unit 5A outputs a difference of grayscale value between the reference outline image E(T) and the outline image E(T−ΔT2) (step S3). As a result, the outline image (A) of FIG. 6 is obtained.

On the other hand, a second operation unit 5B performs a minimum operation in place of calculating the logical multiplication. The minimum operation is defined as a treatment of preparing a processed image by use of a smaller pixel value of corresponding two pixels between two outline images. For example, in the second operation unit 5B, the minimum operation is performed by comparing a grayscale value of the outline image E(T−ΔT1) with the corresponding grayscale value of the outline image E(T+ΔT1), to output a smaller grayscale value thereof (step S41). As a result, the outline image (B) of FIG. 6 is obtained. Next, in the step S42, the second operation unit 5B outputs a difference of grayscale value between the reference outline image E(T) and the outline image (B) obtained by the step S41. When the difference is a negative value, it is regarded as zero. As a result, the outline image (C) of FIG. 4 is obtained.

In the outline extraction unit 6, a minimum operation is performed (step S5) by comparing the grayscale value of the outline image (A) with the corresponding grayscale value of the outline image (C) to output the outline having a smaller grayscale value thereof as the outline synthesized image (F). Thus, the outlines of the background (Y) in the outline images (A) and (C) are eliminated by the minimum operation performed at the step S5. As a result, the image processing device of the present embodiment can extract only the outline of the moving target.

Fifth Embodiment

An image processing device of the fifth embodiment of the present invention is substantially the same as the device of the first embodiment except for the following features. Therefore, no duplicate explanation is deemed to be necessary.

A first operation unit 5A of the present embodiment performs an operation with use of a reference outline image E(T) that is an outline image corresponding to the image taken at a reference time (T), an outline image E(T−ΔT2) corresponding to the image taken at the time (T−ΔT2), and an outline image E(T−ΔT1) corresponding to the image taken at the time (T−ΔT1), to provide a processed outline image having only the outlines with any positional change that occurs between the times (T−ΔT2), (T−ΔT1) and (T).

On the other hand, a second operation unit 5B of the present embodiment performs an operation with use of the reference outline image E(T), an outline image E(T+ΔT1) corresponding to the image taken at the time (T+ΔT1), and an outline image E(T+ΔT2) corresponding to the image taken at the time (T+ΔT2), to provide a processed outline image having only the outlines with any positional change that occurs between the times (T), (T+ΔT1) and (T+ΔT2). The outline extracting unit 6 extracts only the outline of the moving target by synthesizing the outlines of these processed outline images.

Figure 7:
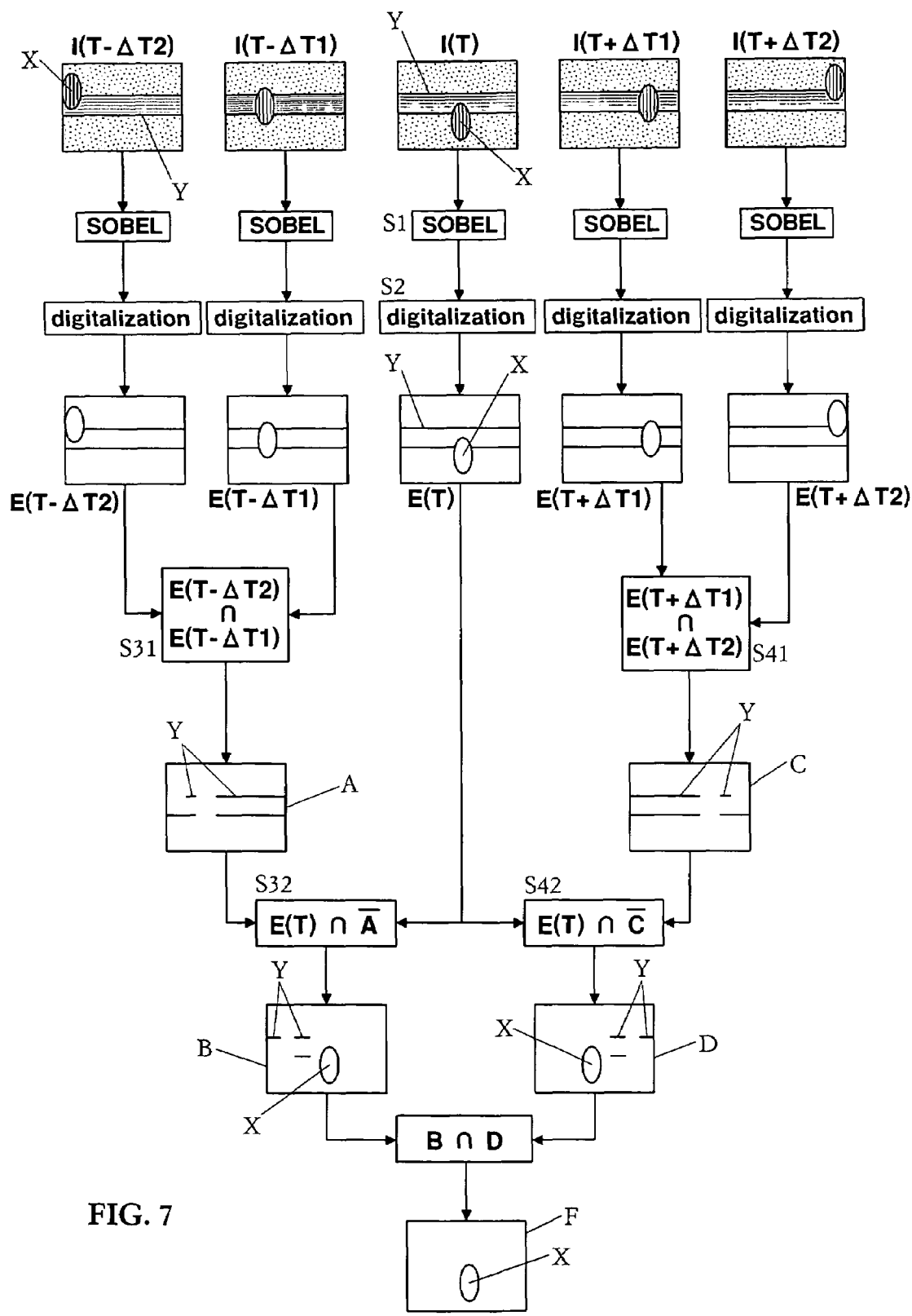
FIG. 7 is a flow diagram of an image processing method according to a fifth embodiment of the present invention.

Referring to the flow diagram of FIG. 7, the image processing method of the present embodiment is explained. As in the case of the first embodiment, the reference outline image E(T) and the outline images E(T−ΔT2), E(T−ΔT1), E(T+ΔT1) and E(T+ΔT2) respectively corresponding to the images I(T), I(T−ΔT2), I(T−ΔT1), I(T+ΔT1) and I(T+ΔT2) are stored in the memory 4.

In the first operation unit 5A of this embodiment, a logical multiplication of the outline image E(T−ΔT2) and the outline image E(T−ΔT1) is calculated (step S31). The outline image (A) of FIG. 7 obtained by this logical multiplication includes only the outlines with no change between the times (T−ΔT2) and (T−ΔT1). Next, the outline image (A) is grayscale inverted to obtain an inverted outline image. In the outline image (A), it is interpreted that the black line showing the presence of the outline (Y) means "1", and the white region showing the absence of the outline means "0". Therefore, in the inverted outline image, the presence of the outline (Y) is shown by white, and the absence of the outline is shown by black. Then, a logical multiplication of the reference outline image E(T) and the inverted outline image is calculated (step S32) to obtain a processed outline image (B) of FIG. 7. In short, only regions shown by black in the reference outline image E(T) and by white in the outline image (A) can be extracted by this logical multiplication. In this embodiment, the processed outline image (B) includes the outline of the moving target (X) at the reference time (T) and the outlines of the background (Y) hidden by the moving target (X) at the times (T−ΔT2) and (T−ΔT1) and appeared at the reference time (T).

On the other hand, in the second operation unit 5B of this embodiment, a logical multiplication of the outline image E(T+ΔT1) and the outline image E(T+ΔT2) is calculated (step S41). The outline image (C) of FIG. 7 obtained by this logical multiplication includes only the outlines with no change between the times (T+ΔT1) and (T+ΔT2). As in the case of the outline image (A), the outline image (C) is grayscale inverted to obtain an inverted outline image, and then a logical multiplication of the reference outline image E(T) and the inverted outline image is calculated (step S42) to obtain a processed outline image (D) of FIG. 7. In this embodiment, the processed outline image (D) includes the outline of the moving target (X) at the reference time (T), the outlines of the background (Y) appeared at the reference time (T) and hidden by the moving target (X) at the times (T+ΔT1) and (T+ΔT2).

Next, an outline extracting unit 6 calculates a logical multiplication of the outline image (B) that is an output of the first operation unit 5A and the outline image (D) that is an output of the second operation unit 5B (step S5) to output an outline synthesized image (F) showing only the outline of the moving target without substantially including the outline of the background.

Sixth Embodiment

An image processing device of the sixth embodiment of the present invention is substantially the same as the device of the fifth embodiment except for the following features. Therefore, no duplicate explanation is deemed to be necessary.

Figure 8:
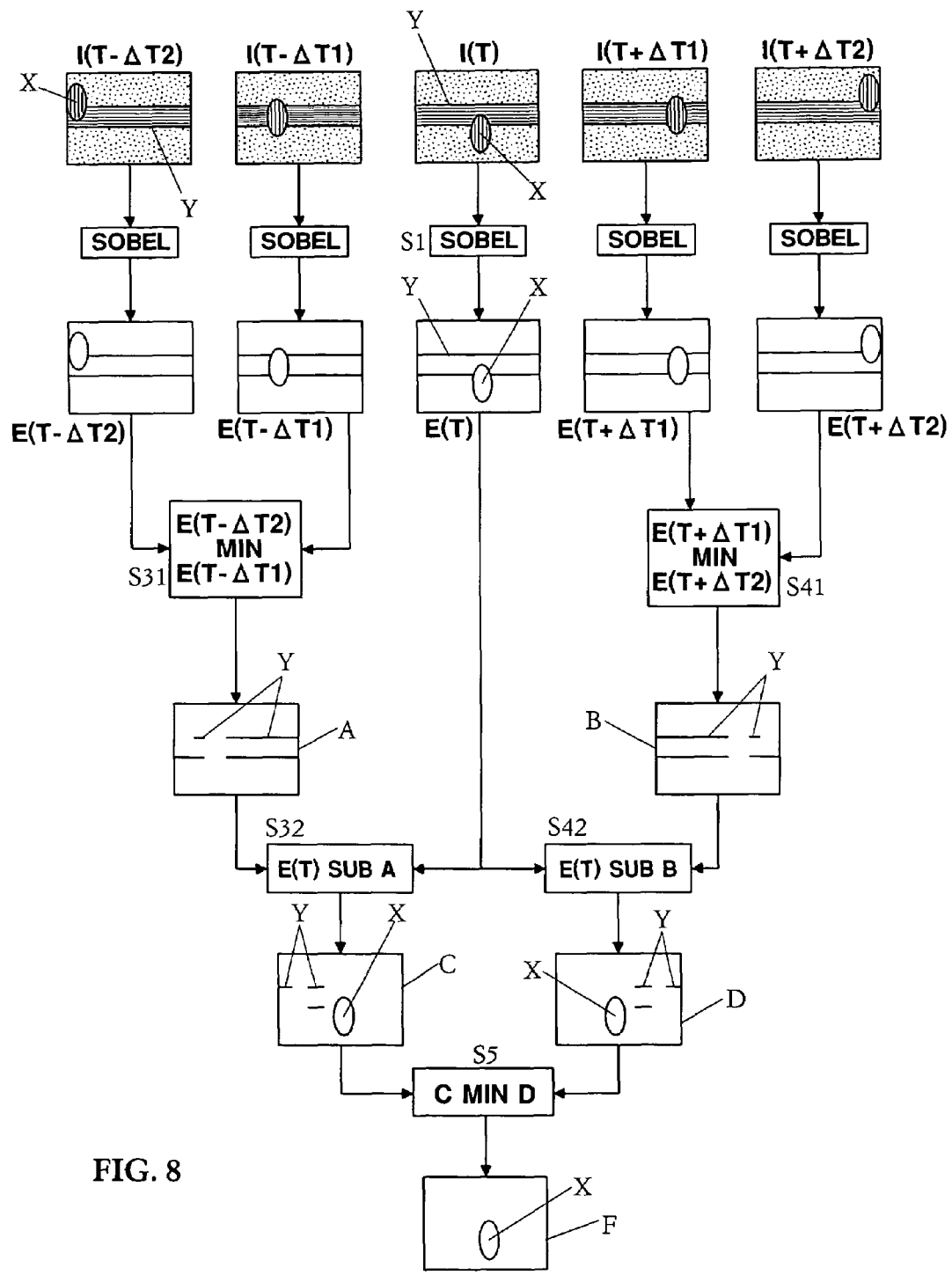
FIG. 8 is a flow diagram of an image processing method according to a sixth embodiment of the present invention.

That is, in this embodiment, the outline image obtained through the differential filter is not digitized. In addition, as shown in FIG. 8, the first operation unit 5A performs a minimum operation in place of calculating the logical multiplication. The minimum operation is defined as a treatment of preparing a processed image by use of a smaller pixel value of corresponding two pixels between two outline images. For example, in a first operation unit 5A, a minimum operation is performed (step S31) by comparing a grayscale value of the outline image E(T−ΔT2) with the corresponding grayscale value of the outline image E(T−ΔT1), to output a smaller grayscale value thereof As a result, the outline image (A) of FIG. 8 is obtained. Similarly, in a second operation unit 5B, another minimum operation is performed (step S41) by comparing a grayscale value of the outline image E(T+ΔT1) with the corresponding grayscale value of the outline image E(T+ΔT2), to output a smaller grayscale value thereof. As a result, the outline image (B) of FIG. 8 is obtained.

In addition, in the step S32, the first operation unit 5A outputs a difference of grayscale value between the reference outline image E(T) and the outline image (A) obtained by the step S31. When the difference is a negative value, it is regarded as zero. As a result, the outline image (C) of FIG. 8 is obtained. On the other hand, in the step S42, the second operation unit 5B outputs a difference of grayscale value between the reference outline image E(T) and the outline image (B) obtained by the step S41. When the difference is a negative value, it is regarded as zero. As a result, the outline image (D) of FIG. 8 is obtained.

Next, an outline extraction unit 6 performs a minimum operation (step S5) by comparing a grayscale value of the outline image (C) with the corresponding grayscale value of the outline image (D) to output the outline having a smaller grayscale value thereof as the outline synthesized image (F). Thus, since the outlines of the background (Y) included in the outline images (C) and (D) are eliminated by the minimum operation performed at the step S5, the image processing device of the present embodiment can extract only the outline of the moving target.

Seventh Embodiment

An image processing device of the seventh embodiment of the present invention is substantially the same as the device of the first embodiment except for the following features. Therefore, no duplicate explanation is deemed to be necessary.

A first operation unit 5A of the present embodiment performs an operation with use of a reference outline image E(T) that is an outline image corresponding to the image taken at a reference time (T), an outline image E(T−ΔT2) corresponding to the image taken at the time (T−ΔT2), and an outline image E(T−ΔT1) corresponding to the image taken at the time (T−ΔT1), to provide a processed outline image including only the outlines with any positional change that occurs between the times (T−ΔT2), (T−ΔT1) and (T).

On the other hand, a second operation unit 5B of the present embodiment performs an operation with use of the reference outline image E(T), and an outline image E(T+ΔT1) corresponding to the image taken at the time (T+ΔT1), to provide a processed outline image including only the outlines with any positional change that occurs between the times (T) and (T+ΔT1). The outline extracting unit 6 extracts only the outline of the moving target by synthesizing the outlines of these processed outline images.

Figure 9:
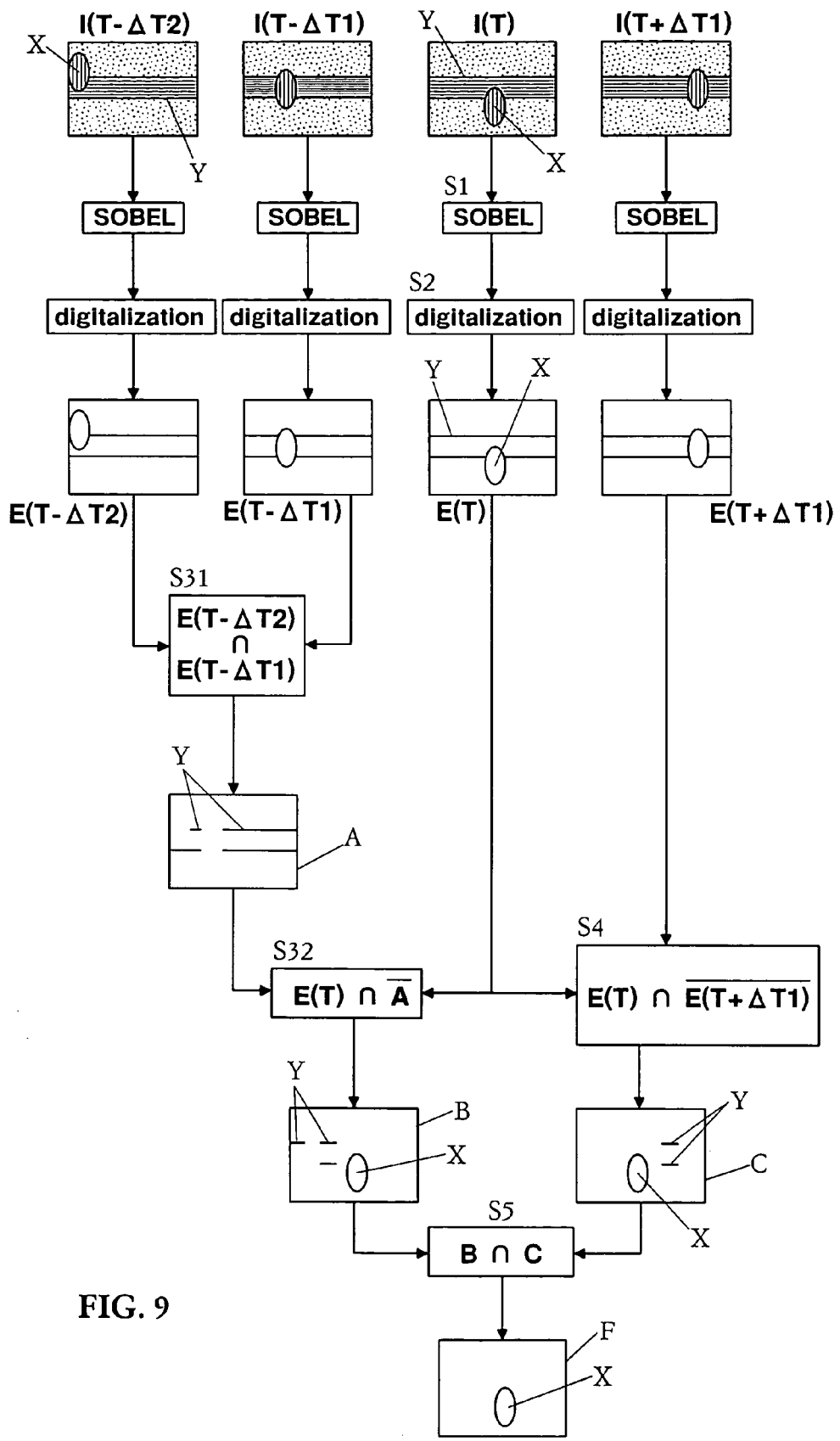
FIG. 9 is a flow diagram of an image processing method according to a seventh embodiment of the present invention.

Referring to the flow diagram of FIG. 9, the image processing method of the present embodiment is explained. As in the case of the first embodiment, the reference outline image E(T), and the outline images E(T−ΔT2), E(T−ΔT1) and E(T+ΔT1) respectively corresponding to the images I(T), I(T−ΔT2), I(T−ΔT1) and I(T+ΔT1) are stored in the memory 4.

In the first operation unit 5A of this embodiment, a logical multiplication of the outline image E(T−ΔT2) and the outline image E(T−ΔT1) is calculated (step S31). The outline image (A) of FIG. 9 obtained by this logical multiplication includes only the outlines with no change between the times (T−ΔT2) and (T−ΔT1). Next, the outline image (A) is grayscale inverted to obtain an inverted outline image. In the outline image (A), it is interpreted that the black line showing the presence of the outline (Y) means "1", and the white region showing the absence of the outline means "0". Therefore, in the inverted outline image, the presence of the outline (Y) is shown by white, and the absence of the outline is shown by black. Then, a logical multiplication of the reference outline image E(T) and the inverted outline image is calculated (step S32) to obtain a processed outline image (B) of FIG. 9. In short, only regions shown by black in the reference outline image E(T) and by white in the outline image (A) can be extracted by this logical multiplication. In this embodiment, the processed outline image (B) includes the outline of the moving target (X) at the reference time (T) and the outlines of the background (Y) hidden by the moving target (X) at the times (T−ΔT2) and (T−ΔT1) and appeared at the reference time (T).

On the other hand, in the second operation unit 5B of this embodiment, As in the case of the outline image (A), the outline image E(T+ΔT1) is grayscale inverted to obtain an inverted outline image, and then a logical multiplication of the reference outline image E(T) and the inverted outline image is calculated (step S4) to obtain a processed outline image (C) of FIG. 9. In this embodiment, the processed outline image (C) includes the outline of the moving target (X) at the reference time (T), and the outlines of the background (Y) appeared at the reference time (T) and hidden by the moving target (X) at the time (T+ΔT1).

Next, an outline extracting unit 6 calculates a logical multiplication of the outline image (B) that is an output of the first operation unit 5A and the outline image (C) that is an output of the second operation unit 5B (step S5) to output an outline synthesized image (F) including only the outline of the moving target without substantially including the outline of the background.

Eigth Embodiment

An image processing device of the eighth embodiment of the present invention is substantially the same as the device of the seventh embodiment except for the following features. Therefore, no duplicate explanation is deemed to be necessary.

Figure 10:
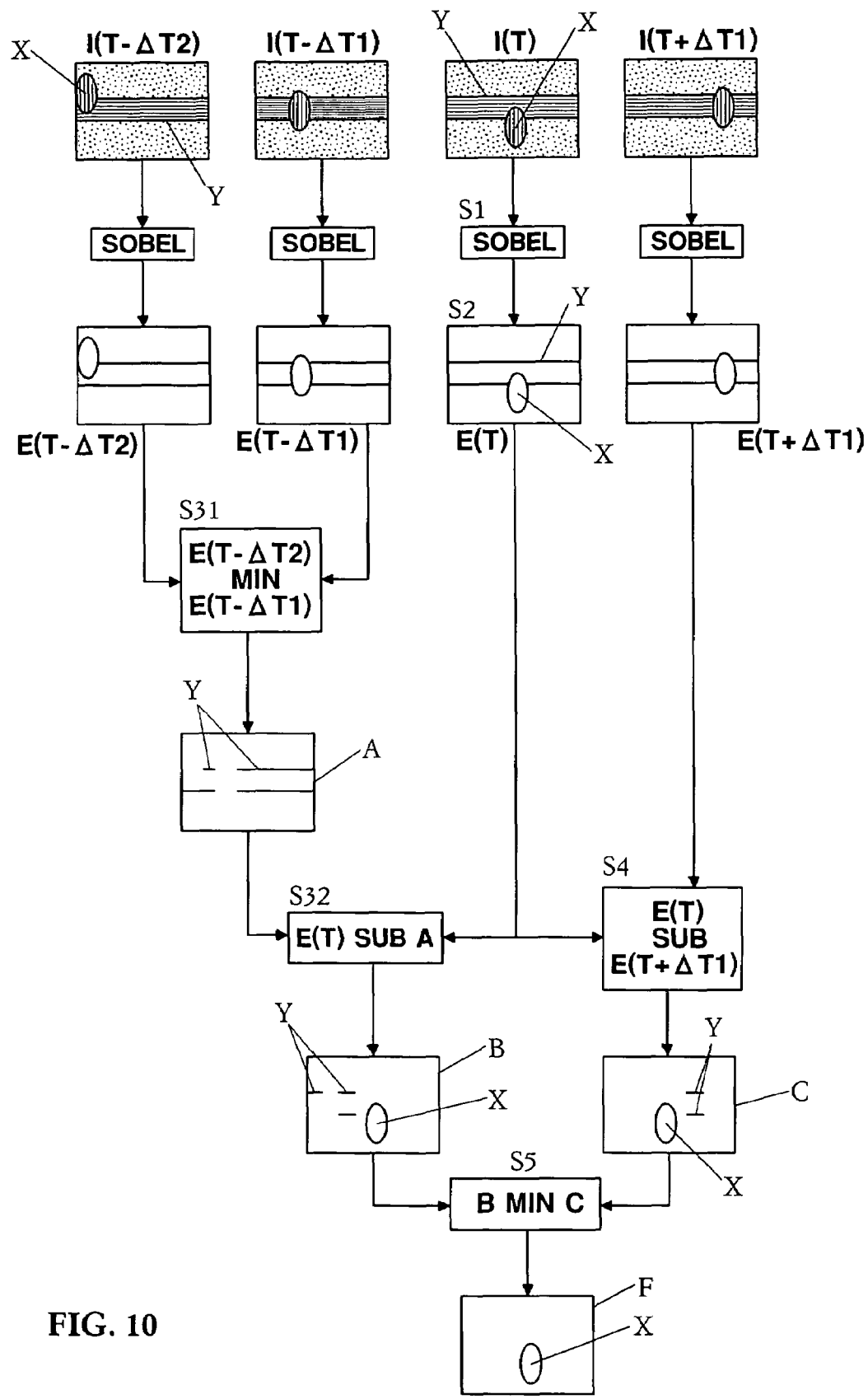
FIG. 10 is a flow diagram of an image processing method according to a eighth embodiment of the present invention.
Figure 11:
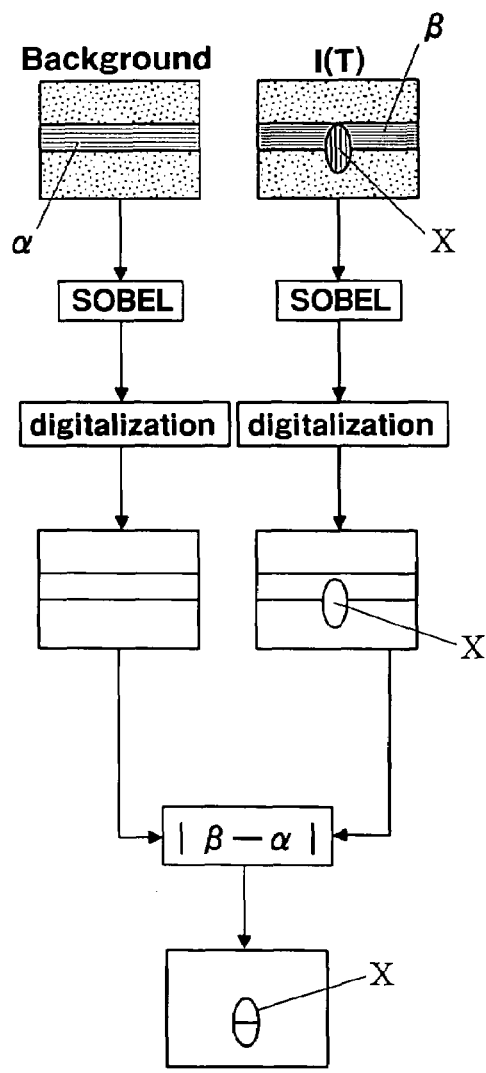
FIG. 11 is a flow diagram of a conventional image processing method.
Figure 12:
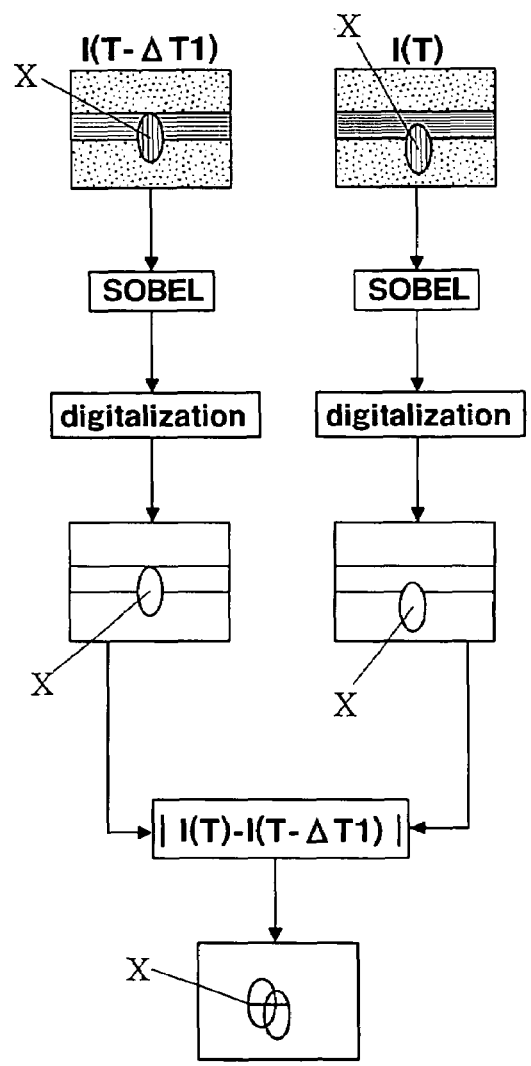
FIG. 12 is a flow diagram of another conventional image processing method.
Figure 13:
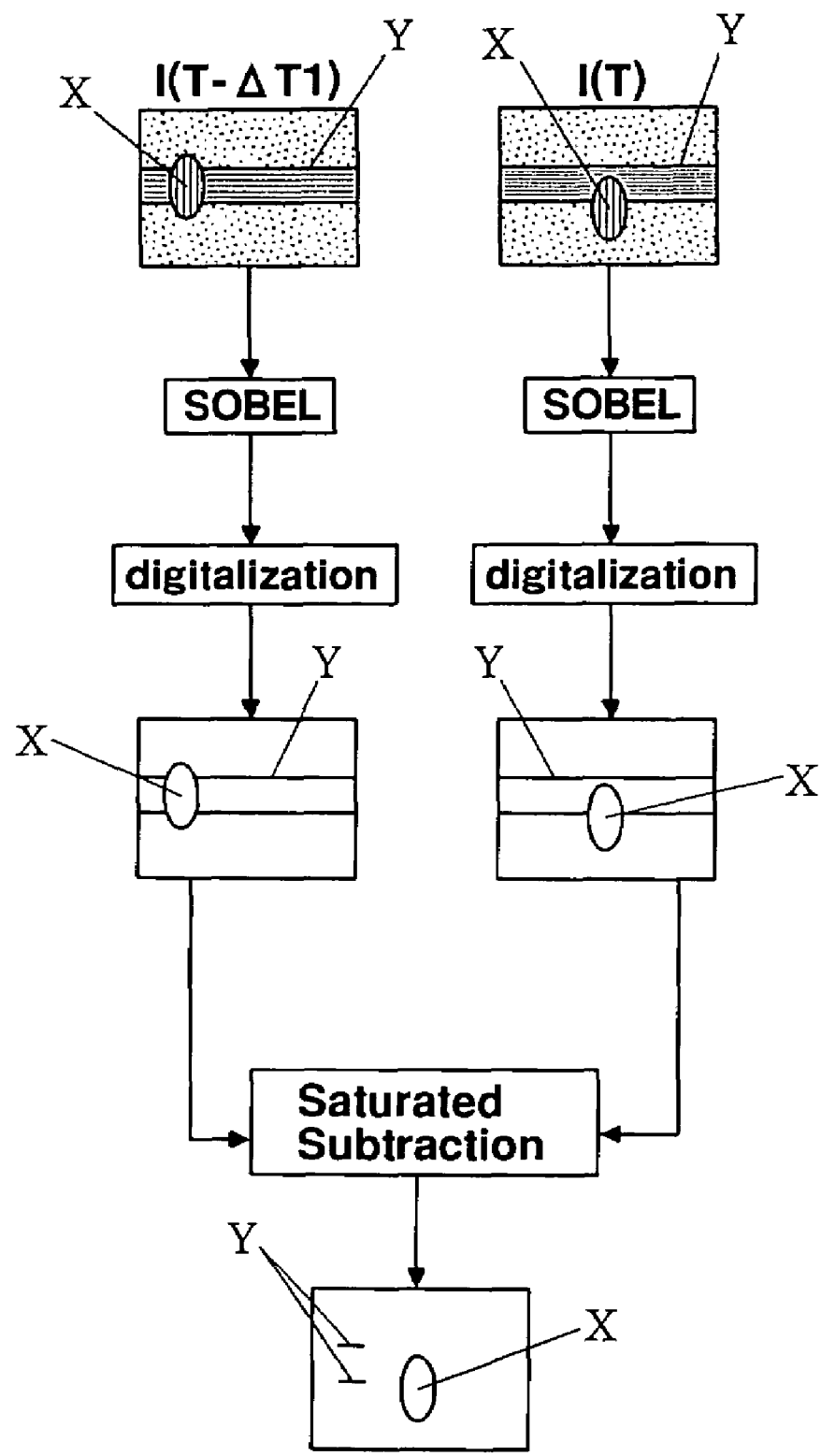
FIG. 13 is a flow diagram of still another conventional image processing method.

That is, in this embodiment, the outline image obtained through the differential filter is not digitized. In addition, as shown in FIG. 10, a first operation unit 5A performs a minimum operation in place of calculating the logical multiplication. The minimum operation is defined as a treatment of preparing a processed image by use of a smaller pixel value of corresponding two pixels between two outline images. For example, in the first operation unit 5A, a minimum operation is performed (step S31) by comparing a grayscale value of the outline image E(T−ΔT2) with the corresponding grayscale value of the outline image E(T−ΔT1), to output a smaller grayscale value thereof. As a result, the outline image (A) of FIG. 10 is obtained. Next, in the step S32, the first operation unit 5A outputs a difference of grayscale value between the reference outline image E(T) and the outline image (A) obtained by the step S31. When the difference is a negative value, it is regarded as zero. As a result, the outline image (B) of FIG. 10 is obtained.

On the other hand, in the step S4, the second operation unit 5B outputs a difference of grayscale value between the reference outline image E(T) and the outline image E(T+ΔT1). When the difference is a negative value, it is regarded as zero. As a result, the outline image (C) of FIG. 10 is obtained.

Next, an outline extraction unit 6 performs a minimum operation (step S5) by comparing the grayscale value of the outline image (B) with the corresponding grayscale value of the outline image (C) to output the outline having a smaller grayscale value thereof as the outline synthesized image (F). Thus, since the outlines of the background (Y) included in the outline images (B) and (C) are eliminated by the minimum operation performed at the step S5, the image processing device of the present embodiment can extract only the outline of the moving target.

As understood from the preferred embodiments described above, according to the present invention, it is not necessary to previously take a background image including no moving target, which is essential in an image processing using the background subtraction method. In addition, it is possible to avoid a problem of the frame subtraction method that the outline of the moving target may be extracted together with the background information. Therefore, the image processing device and method of the present invention can provide more reliable information with regard to the recognition of the moving target such as human and vehicle, as compared with conventional image processing devices, regardless of whether the moving target has an intermittent motion or a continuous motion.

What is claimed is:

1. An image processing device for recognizing an outline of a moving target comprising:

an image pick-up means for taking a plurality of images in times series, in each of which said moving target exists;

an image conversion means for converting said images into outline images;

a memory for storing said outline images;

a first operation means for performing an operation with use of a reference outline image that is one of said outline images corresponding to said image taken at a reference time, a first outline image that is one of said outline images corresponding to said image taken at a first time other than the reference time, and a second outline image that is one of said outline images corresponding to said image taken at a second time other than the reference time and the first time, to provide a processed outline image having only outlines with any positional change that occurs between the reference time, the first time and the second time;

a second operation means for performing an operation with use of said reference outline image, and a third outline image that is one of said outline images corresponding to said image taken at a third time other than the reference time, the first time and the second time, to provide a processed outline image having only outlines with any positional change that occurs between the reference time and the third time; and an outline extracting means for extracting the outline of said moving target from the processed outline images provided from said first operation means and said second operation means.

2. The image processing device as set forth in claim 1, wherein said second operation means performs the operation with use of said reference outline image, said third outline image, and a fourth outline image that is one of said outline images corresponding to said image taken at a fourth time other than the reference time, the first time, the second time and the third time, to provide the processed outline image having only outlines with any positional change that occurs between the reference time, the third time and the fourth time.

3. The image processing device as set forth in claim 2, wherein said first operation means performs the operation with use of said reference outline image that is said outline image corresponding to said image taken at the center of both of first and second time periods as the reference time, said first outline image that is said outline image corresponding to said image taken at a start time of said first time period as the first time, and said second outline image that is said outline image corresponding to said image taken at a finish time of said first time period as the second time, and wherein said second operation means performs the operation with use of said reference outline image, said third outline image that is said outline image corresponding to said image taken at a start time of said second time period as the third time, and said fourth outline image that is one of said outline images corresponding to said image taken at a finish time of said second time period as the fourth time.

4. The image processing device as set forth in claim 3, wherein said first operation means performs a minimum operation between said first outline image and said second outline image, and then determines a difference between said reference outline image and a result of said minimum operation, to provide the processed outline image, and wherein said second operation means performs a minimum operation between said third and said fourth outline images, and then determines a difference between said reference outline image and a result of said minimum operation, to provide the processed outline image.

5. The image processing device as set forth in claim 2, wherein said first operation means performs a minimum operation between said first outline image and said second outline image, and then determines a difference between said reference outline image and a result of said minimum operation, to provide the processed outline image, and wherein said second operation means performs a minimum operation between said third and said fourth outline images, and then determines a difference between said reference outline image and a result of said minimum operation, to provide the processed outline image.

6. The image processing device as set forth in claim 2, wherein said first operation means performs the operation with use of said reference outline image that is said outline image corresponding to said image taken a finish end of a first time period as well as a start end of a second time period as the reference time, said first outline image that is said outline image corresponding to said image taken at the first time within said first time period, and said second outline image that is said outline image corresponding to said image taken at a start end of said first time period as the second time, and wherein said second operation means performs the operation with use of said reference outline image, said third outline image that is said outline image corresponding to said image taken at the third time within said second time period, and said fourth outline image that is said outline image corresponding to said image taken at a finish end of said second time period as the fourth time.

7. The image processing device as set forth in claim 6, wherein a time interval between the first time and the reference time is equal to the time interval between the third time and the reference time, and a time interval between the second time and the reference time is equal to the time interval between the fourth time and the reference time.

8. The image processing device as set forth in claim 6, wherein said first operation means performs a minimum operation between said first outline image and said second outline image, and then determines a difference between said reference outline image and a result of said minimum operation, to provide the processed outline image, and wherein said second operation means performs a minimum operation between said third and said fourth outline images, and then determines a difference between said reference outline image and a result of said minimum operation, to provide the processed outline image.

9. The image processing device as set forth in claim 1, wherein said first operation means performs the operation with use of said reference outline image that is said outline image corresponding to said image taken at the center of a first time period as well as an end of a second time period as the reference time, said first outline image that is said outline image corresponding to said image taken at a start time of said first time period as the first time, and said second outline image that is said outline image corresponding to said image taken at a finish time of said first time period as the second time, and wherein said second operation means performs the operation with use of said reference outline image, and said third outline image that is said outline image corresponding to said image taken at the other end of said second time period as the third time.

10. The image processing device as set forth in claim 9, wherein said first operation means performs a minimum operation between said first outline image and said second outline image, and then determines a difference between said reference outline image and a result of said minimum operation, to provide the processed outline image, and wherein said second operation means determines a difference between said reference outline image and said third outline image to provide the processed outline image.

11. The image processing device as set forth in claim 1, wherein said first operation means performs the operation with use of said reference outline image that is said outline image corresponding to said image taken at a finish end of a first time period as well as a start end of a second time period as the reference time, said first outline image that is said outline image corresponding to said image taken at the first time within said first time period, and said second outline image that is said outline image corresponding to said image taken at a start end of said first time period as the second time, and wherein said second operation means performs the operation with use of said reference outline image, and said third outline image that is said outline image corresponding to said image taken at a finish end of said second time period as the third time.

12. The image processing device as set forth in claim 11, wherein a time interval between the first time and the reference time is equal to the time interval between the third time and the reference time.

13. The image processing device as set forth in claim 11, wherein said first operation means performs a minimum operation between said first outline image and said second outline image, and then determines a difference between said reference outline image and a result of said minimum operation, to provide the processed outline image, and wherein said second operation means determines a difference between said reference outline image and said third outline image to provide the processed outline image.

14. The image processing device as set forth in claim 1, wherein said outline extracting means performs a minimum operation between the processed outline images provided from said first operation means and said second operation means.

15. An image processing method of recognizing an outline of a moving target, said method comprising the steps of:

taking a plurality of images in times series, in each of which said moving target exists;

converting said images into outline images;

storing said outline images;

performing a first operation with use of a reference outline image that is one of said outline images corresponding to said image taken at a reference time, a first outline image that is one of said outline images corresponding to said image taken at a first time other than the reference time, and a second outline image that is one of said outline images corresponding to said image taken at a second time other than the reference time and the first time, to provide a processed outline image having only outlines with any positional change that occurs between the reference time, the first time and the second time;

performing a second operation with use of said reference outline image, and a third outline image that is one of said outline images corresponding to said image taken at a third time other than the reference time, the first time and the second time, to provide a processed outline image having only outlines with any positional change that occurs between the reference time and the third time; and extracting the outline of said moving target from the processed outline images obtained by said first and second operation steps.

\* \* \* \* \*